United States Patent Office 3,597,410
Patented Aug. 3, 1971

---

3,597,410
PROCESS FOR RETARDING THE HARDENING OF EPOXIDE RESINS USING A BARBITURIC RETARDER AND RETARDING COMPOSITIONS
Edgar Lieske, Dusseldorf, and Erwin Weinrich, Dusseldorf-Holthausen, Germany, assignors to Henkel & Cie G.m.b.H., Dusseldorf-Holthausen, Germany
No Drawing. Filed Apr. 22, 1969, Ser. No. 818,422
Claims priority, application Switzerland, Apr. 29, 1968, 6,342/68; Germany, Feb. 1, 1969, P 19 04 936.6
Int. Cl. C08g 30/10
U.S. Cl. 260—77.5R      9 Claims

ABSTRACT OF THE DISCLOSURE

A process for retarding the hardening of an epoxide resin at elevated temperatures which comprises admixing a retarding amount of a barbituric compound having the formula

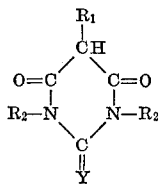

wherein Y is a member selected from the group consisting of O and S, $R_2$ represents members selected from the group consisting of hydrogen and alkyl having from 1 to 8 carbon atoms, phenyl, and halogen and nitro substituted derivatives thereof, and $R_1$ represents members selected from the group consisting of hydrogen, nitro and nitroso, to a hardenable mixture of (1) a hardenable epoxide compound containing more than one epoxide group in the molecule and (2) an organic polycarboxylic acid anhydride epoxide resin hardener, said hardenable mixture being maintained at a temperature sufficient to cause an epoxide resin hardening reaction. The compositions containing the barbituric compounds delay the hardening of the hardenable epoxide resin mixture for varying times depending on the amount of retarding compound utilized as well as the hardenable epoxide resin and the temperature.

THE PRIOR ART

Hardenable mixtures of a hardenable epoxide compound containing more than one epoxide group in the molecule and an organic polycarboxylic acid anhydride epoxide resin hardener having a definite period of reaction where they become more viscous and finally harden. For many purposes the hardenable mixtures must have work performed on them before they harden. This period of reaction is sometimes called the "pot life" and depends on the type or structure of the hardenable epoxide compound and the organic polycarboxylic acid anhydride, as well as the degree of purity of these compounds and further factors such as the temperature, size of the batch, etc. It is frequently desirable to prolong the period of reaction of such hardenable mixtures.

OBJECTS OF THE INVENTION

An object of the present invention is the development of a method of prolonging the period of reaction of hardenable mixtures based on hardenable epoxide resin compounds.

Another object of the invention is the development of a process for retarding the hardening of an epoxide resin at elevated temperatures which comprises admixing a retarding amount of a barbituric compound having the formula

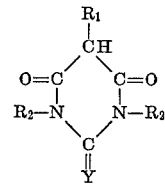

wherein Y is a member selected from the group consisting of O and S, R represents members selected from the group consisting of hydrogen and alkyl having from 1 to 8 carbon atoms, phenyl, and halogen and nitro substituted derivatives thereof, and $R_1$ represents members selected from the group consisting of hydrogen, nitro and nitroso, to a hardenable mixture of (1) a hardenable epoxide compound containing more than one epoxide group in the molecule and (2) an organic polycarboxylic acid anhydride epoxide resin hardener, said hardenable mixture being maintained at a temperature sufficient to cause an epoxide resin hardening reaction.

A further object of the invention is the obtention of a hardenable epoxide resin composition comprising a mixture of (1) a hardenable epoxide compound containing more than one epoxide group in the molecule, (2) an organic polycarboxylic acid anhydride epoxide resin hardener, the ratio of said epoxide compound to said acid anhydride being such that from 0.6 to 1.2 polycarboxylic acid anhydride groups are present for each epoxide group, and (3) a retarding amount of a barbituric compound having the formula

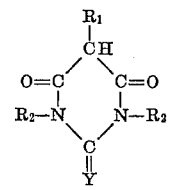

wherein Y is a member selected from the group consisting of O and S, $R_2$ represents members selected from the group consisting of hydrogen and alkyl having from 1 to 8 carbon atoms, phenyl, and halogen and nitro substituted derivatives thereof, and $R_1$ represents members selected from the group consisting of hydrogen, nitro and nitroso.

These and other objects of the invention will become more apparent as the description thereof proceeds.

DESCRIPTION OF THE INVENTION

It has now been found that the reaction period of hardenable mixtures of a hardenable epoxide compound containing more than one vicinal epoxide group in the molecule and an organic polycarboxylic acid anhydride epoxide resin hardener may be prolonged if a barbituric compound having the formula

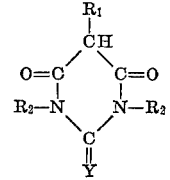

wherein Y is a member selected from the group consisting of O and S, $R_2$ represents members selected from the group consisting of hydrogen and alkyl having from 1 to 8 carbon atoms, phenyl, and halogen and nitro substituted derivatives thereof, and $R_1$ represents members selected from the group consisting of hydrogen, nitro and nitroso, is added to the hardenable mixtures in an amount sufficient to effect the desired delay. The barbituric compounds utilized in the process of the invention are, therefore, barbituric acid, or thiobarbituric acid or their N-substituted derivatives or their nitro derivatives or their nitroso derivatives. Preferably the barbituric compounds are utilized in the hardenable mixtures in amounts of from 0.001% to 3% by weight, based on the amount of the hardenable epoxide compound present in the mixtures.

When N-substituted derivatives of barbituric acid or thiobarbituric acid are employed, these substituents may be one or two alkyl groups having from 1 to 8 carbon atoms or one or two phenyl groups. As alkyl groups are, for example, methyl, ethyl, butyl or octyl. These radicals may also contain additional substituents such as halogens or nitro groups, for example, chloroethyl and nitrobutyl. The phenyl substituted compounds may also contain additional substituents such as halogens or nitro groups, for example, p-chlorophenyl and o-nitrophenyl. In addition, 5-nitro and 5-nitroso derivatives of barbituric acid and thiobarbituric acid which are easily accessible, may be employed.

The retarding additives of the invention are suitable for addition to hardenable mixtures of all conventional hardenable epoxide compounds containing more than one epoxide group in the molecule and all organic polycarboxylic acid anhydrides known as epoxide resin hardeners. The period of the delay of the hardening reaction depends, among other conditions, on the type of epoxide compound. Generally hardenable mixtures containing epoxide compounds which have a short duration of the period of the hardening reaction are more strongly influenced by the retarding additives than mixtures containing epoxide compounds which have a longer duration of the period of the hardening reaction.

A particularly strong retarding action is achieved on the addition of barbituric acid or its derivative to hardenable mixtures of glycidyl isocyanurates, particularly crystalline glycidyl isocyanurates, and anhydrides of organic polycarboxylic acids.

As hardenable epoxide compounds containing more than one epoxide group in the molecule, for example, glycidyl ethers of polyhydric phenols, cycloaliphtic epoxide compounds and glycidyl isocyanurates can be used.

Suitable glycidyl ethers of polyhydric phenols are, for example, diglycidyl ethers of dihydric phenols such as the glycidyl ethers of diphenylolpropane (Bisphenol A) with an epoxide equivalent of 170 to about 4,000, the glycidyl ether of cholrinated, brominated or methylated diphenyloloropropane as well as the glycidyl ether of hydroquinone or resorcinol. The epoxide equivalent of these latter epoxide compounds is preferably between 170 and 1,200. These glycidyl ethers of polyhydric phenols are produced by a reaction of the polyhydric phenol with epichlorohydrin.

As cycloaliphatic epoxide compounds having more than one epoxide group in the molecule are, for example, those which contain two epoxidized cyclohexene radicals in the molecule, such as 3,4-epoxy-hexahydro-6-methyltetrahydrobenzyl, 3',4' - epoxy - 6' - methylhexahydrobenzoate of the diepoxide of the acetal of cyclohexene aldehyde and 1,1-dimethylolcyclohexene. In addition, are cycloaliphatic epoxide compounds which contain more than half their epoxide groups attached to the cycloaliphatic ring system such as the glycidyl esters of cycloaliphatic ploycarboxylic acid compounds, for example, the digylcidyl ester of hexahydrophthalic acid or tetrahydrophthalic acid.

In the case that triglycidyl isocyanurate is employed as an epoxide compound containing several epoxide groups in the molecule, this should preferably be crystalline and have an epoxide oxygen content of at least 14%.

The usual anhydrides of organic polycarboxylic acids can be employed as acid anhydride epoxide hardeners, for example, hexahydrophthalic acid anhydride, methylhexahydrophthalic acid anhydride, tetrahydrophthalic acid anhydride, phthalic acid anhydride, dodecenylsuccinic acid anhydride, pyromellitic acid anhydride, methylendomethylene-tetrahydrophthalic acid anhydride, tetrachlorophthalic acid anhydride, adipic acid anhydride, sebacic acid anhydride and many others.

As a rule, the amount of the organc polycarboxylic acid anhydride epoxide hardener to be used as hardener with the hardenable epoxide compound should be measured so that 0.6 to 1.2, preferably 0.8 to 0.9, polycarboxylic acid onhydride groups are present in the hardenable mixture for each epoxide group.

By the use of the retarding additives of the invention, the delay in the period of the hardening reaction of the hardenable mixtures can be adjusted within well defined periods. In addition, it is possible to overcome the delaying or retarding effect on the hardening action by adding conventional accelerators to the hardenable mixtures. This gives the advantage that, for example, in molding operations, the hardening process can be delayed in the event of unforeseen circumstances after the hardenable mixtures have been compounded, and thereafter cancel this delaying effect by the addition of accelerators. Effective accelerators for this purpose are the known epoxide resin hardening accelerators, for example, tris-(dimethylaminomethyl)-phenol, dimethylbenzylamine, trimethylbenzylammonium chloride, etc.

In well known manner, dyes or fillers can be added to the mixtures prepared according to the invention, such as, for example, metallic powder, quartz powder, glass powder, glass fibers, mica, aluminum oxide, titanium oxide, ground dolomite or barium sulfate.

The hardenable epoxide resin compositions according to the invention can be easily obtained by melting together the epoxide compound containing at least one epoxide group in the molecule with the organic polycarboxylic acid anhydride employed as the hardening agent and with the retarding additive.

The hardening of the reaction mixtures is carried out in the usual manner at temperatures of 80° C. to 250° C., particularly 100° to 200° C., depending on the ingredients.

The following examples will serve for better comprehension of the invention. However, they do not limit the scope of the invention in any manner.

Example 1

100 gm. of triglycidyl isocyanurate (epoxide equivalent 102) and 140 gm. of hexahydrophthalic acid anhydride were separably heated to a temperature of 120° C. and then mixed. The mixture was kept constantly at a temperature of 120° C., and the change of the viscosity was measured with a rotation viscosity meter. The time was measured, which was required, in order for the mixture to attain a viscosity of 1500 cp. The measurement was effected according to DIN 16,945 (isothermal viscosity curve). From this value, 10 minutes were deducted, and the value obtained was reported as the "Reactivity Value."

As a comparison, the two ingredients were mixed together with 1 gm. of barbituric acid and the Reactivity Value was determined. Without the addition of barbituric acid, the Reactivity Value was 22 minutes; with the addition of 1 gm. of barbituric acid, the Reactivity Value was 100 minutes.

Example 2

100 gm. of the diglycidyl ester of hexahydrophthalic acid (epoxide equivalent 165) and 85 gm. of hexahydrophthalic acid anhydride were heated and mixed at a temperature of 130° C., similarly as in Example 1. The Reactivity Value was determined to be 35 minutes.

When 1 gm. of barbituric acid was added to the heated mixture of the two ingredients, the Reactivity Value became 70 minutes.

Example 3

An initial mixture consisting of 150 gm. of an epoxide resin based on diphenylolpropane (epoxide equivalent 398) and 52 gm. of hexahydrophthalic acid was prepared at a temperature of 120° C. The change in viscosity to attain a viscosity of 7500 cp. at 120° C. was measured as the endpoint under otherwise similar conditions as in Example 1 were followed. The Reactivity Value was 70 minutes.

When 1 gm. of barbituric acid was added to the heated mixture of the two ingredients, the Reactivity Value became 110 minutes.

Example 4

An initial mixture consisting of 100 gm. of a cycloaliphatic epoxide resin (epoxide equivalent 220) and 63 gm. of hexahydrophthalic acid anhydride was prepared at a temperature of 130° C. The Reactivity Value was 25 minutes.

When 1 gm. of barbituric acid was added to the heated mixture of the two ingredients, the Reactivity Value became 50 minutes.

Example 5

An initial mixture consisting of 100 gm. of an epoxide resin based on diphenylolpropane (epoxy equivalent 185) and 75 gm. of hexahydrophthalic acid anhydride was prepared at a temperature of 150° C. The Reactivity Value was 300 minutes.

When 1 gm. of barbituric acid was added to the heated mixture of the two ingredients, the Reactivity Value became 720 minutes.

Example 6

As described in Example 1, a mixture of 100 gm. of triglycidyl isocyanurate and 140 gm. of hexahydrophthalic acid anhydride was prepared at a temperature of 120° C. The change of viscosity was determined and the Reactivity Value was measured.

On addition of 1 gm. of the retarding additive to the heated mixture of the two ingredients, the following Reactivity Values as shown in Table I were obtained.

TABLE I

| Retarding additive 1 gm. | Reactivity Value in minutes |
| --- | --- |
| None | 22 |
| N,N'-diphenylbarbituric acid | 275 |
| 5-nitrobarbituric acid | 79 |
| 2-thiobarbituric acid | 53 |

The preceding specific embodiments are illustrative of the practice of the invention. It is to be understood, however, that other expedients known to those skilled in the art may be employed without departing from the spirit of the invention.

We claim:

1. A process for retarding the hardening of an epoxide resin at temperatures of from 80° C. to 250° C. which consists essentially of admixing from 0.001% to 3% by weight based on the amount of hardenable epoxide resin present of a barbituric compound having the formula

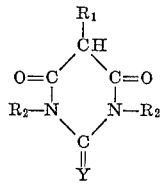

wherein Y is a member selected from the group consisting of O and S, $R_2$ represents members selected from the group consisting of hydrogen, alkyl having from 1 to 8 carbon atoms, haloalkyl having from 1 to 8 carbon atoms, nitroalkyl having from 1 to 8 carbon atoms, phenyl, nitrophenyl and halophenyl, and $R_1$ represents members selected from the group consisting of hydrogen, nitro and nitroso, to a hardenable mixture of (1) a hardenable epoxide compound containing more than one vicinal epoxide group in the molecule and (2) an organic polycarboxylic acid anhydride epoxide resin hardener, the ratio of said epoxide compound to said acid anhydride being such that from 0.6 to 1.2 polycarboxylic acid anhydride groups are present for each epoxide group, said hardenable mixture being maintained at a temperature of from 80° C. to 250° C. and sufficient to cause an epoxide resin hardening reaction.

2. The process of claim 1 wherein said barbituric compound is N,N'-di-lower-alkylbarbituric acid.

3. The process of claim 1 wherein said barbituric compound is N,N'-diphenylbarbituric acid.

4. The process of claim 1 wherein said barbituric compound is barbituric acid.

5. The process of claim 1 wherein said barbituric compound is thiobarbituric acid.

6. The process of claim 1 wherein said hardenable epoxide compound containing more than one epoxide group in the molecule is a glycidyl isocyanurate.

7. A hardenable epoxide resin composition consisting essentially of a mixture of (1) a hardenable epoxide compound containing more than one vicinal epoxide group in the molecule, (2) an organic polycarboxylic acid anhydride epoxide resin hardener, the ratio of said epoxide compound to said acid anhydride being such that from 0.6 to 1.2 polycarboxylic acid anhydride groups are present for each epoxide group, and (3) from 0.01% to 3% by weight based on the amount of said hardenable epoxide compound of a barbituric compound having the formula

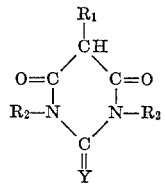

wherein Y is a member selected from the group consisting of O and S, $R_2$ represents members selected from the group consisting of hydrogen, alkyl having from 1 to 8 carbon atoms, haloalkyl having from 1 to 8 carbon atoms, nitroalkyl having from 1 to 8 carbon atoms, phenyl, nitrophenyl and halophenyl, and $R_1$ represents members selected from the group consisting of hydrogen, nitro and nitroso, whereby the hardening of said hardenable epoxide resin composition is retarded at temperatures of from 80° C. to 250° C.

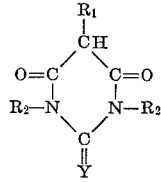

wherein Y is a member selected from the group consisting of O and S, $R_2$ represents members selected from the group consisting of hydrogen and alkyl having from 1 to 8 carbon atoms, phenyl, and halogen and nitro substituted derivatives thereof, and $R_1$ represents members selected from the group consisting of hydrogen, nitro and nitroso.

8. The composition of claim 7 wherein said hardenable epoxide compound containing more than one epoxide group in the molecule is a glycidyl isocyanurate.

9. A process for delaying the hardening reaction period of a hardenable epoxide resin mixture at temperatures of from 80° C. to 250° C. and thereafter hardening said mixture which consists essentially of the steps of admixing from 0.001% to 3% by weight based on the amount of hardenable epoxide compound of a barbituric compound having the formula

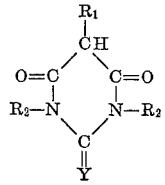

wherein Y is a member selected from the group consisting of O and S, $R_1$ represents members selected from the group consisting of hydrogen, alkyl having from 1 to 8 carbon atoms, haloalkyl having from 1 to 8 carbon atoms, nitroalkyl having from 1 to 8 carbon atoms, phenyl, nitrophenyl and halophenyl, and $R_1$ represents members selected from the group consisting of hydrogen, nitro and nitroso, to a hardenable mixture of (1) a hardenable epoxide compound containing more than one vicinal epoxide group in the molecule and (2) an organic polycarboxylic acid anhydride epoxide resin hardener, the ratio of said epoxide compound to said acid anhydride being such that from 0.6 to 1.2 polycarboxylic acid anhydride groups are present for each epoxide group, said hardenable mixture being maintained at a temperature of from 80° C. to 250° C. and sufficient to cause an epoxide resin hardening reaction, holding said mixture at said temperatures for the desired period, adding an effective amount of an epoxide resin hardening accelerator and hardening said mixture.

References Cited

UNITED STATES PATENTS 3,494,888   2/1970   McElroy _____ 260—77.51SO

WILLIAM H. SHORT, Primary Examiner

T. E. PERTILLA, Assistant Examiner

U.S. Cl. X.R.

260—37EP, 47EC, 78.4EP

PC-1050
(5/69)

UNITED STATES PATENT OFFICE
CERTIFICATE OF CORRECTION

Patent No. 3,597,410      Dated August 3, 1971

Inventor(s) EDGAR LIESKE and ERWIN WEINRICH

It is certified that error appears in the above-identified patent and that said Letters Patent are hereby corrected as shown below:

IN THE PATENT APPLICATION

| Column | Line  | Page | Line |                                              |
|--------|-------|------|------|----------------------------------------------|
| 2      | 12    | 3    | 8    | "R" should be -- $R_2$ --                    |
| 6      | 45-58 |      |      | These lines are superfluous and should be omitted. |

Signed and sealed this 11th day of April 1972.

(SEAL)
Attest:

EDWARD M. FLETCHER, JR.　　　　　　　　　ROBERT GOTTSCHALK
Attesting Officer　　　　　　　　　　　　Commissioner of Patents